Feb. 27, 1934.  E. BEHRINGER  1,949,265
FREEZING APPARATUS
Filed Dec. 31, 1930  2 Sheets-Sheet 1
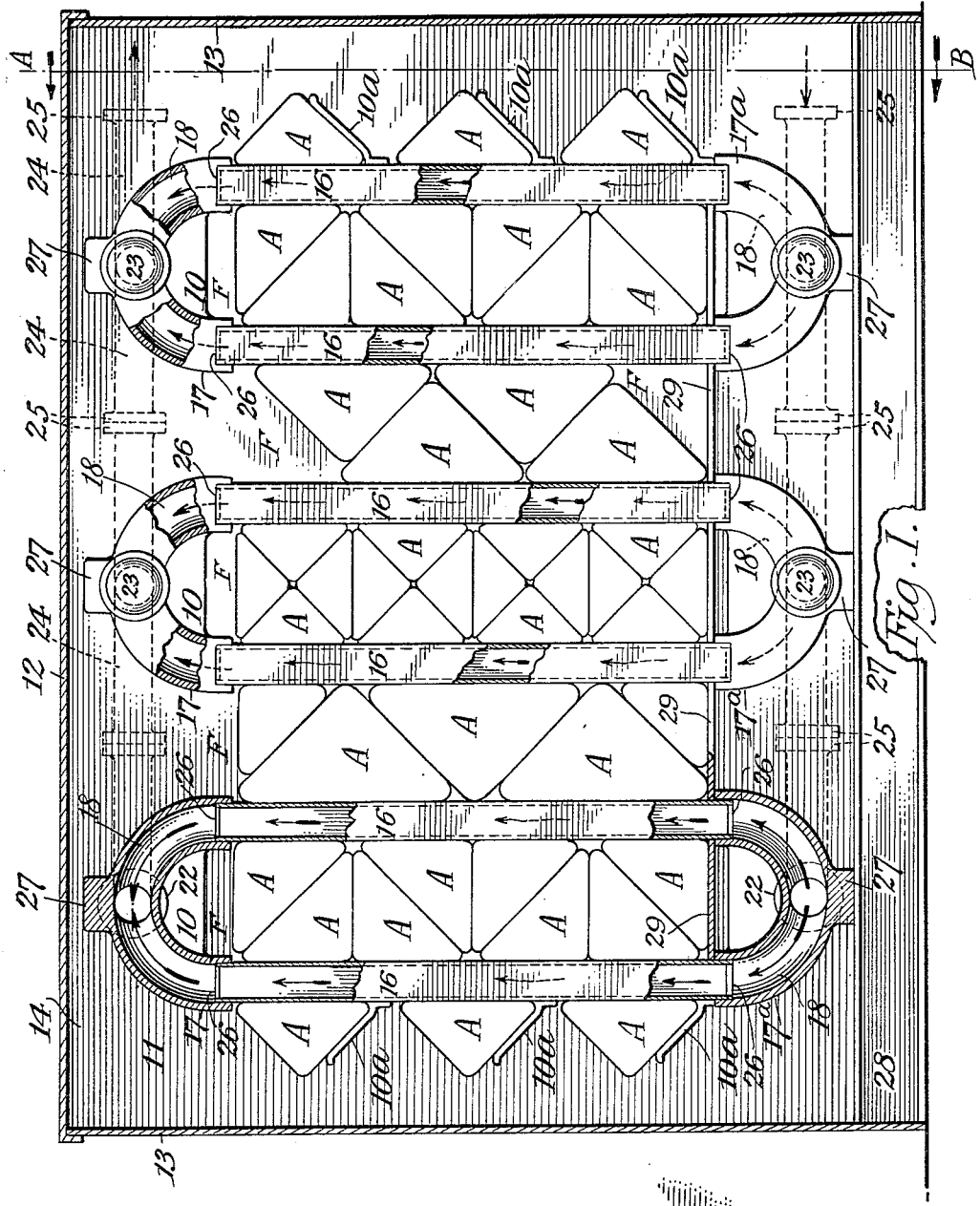
INVENTOR,
Emil Behringer,
BY
Harold J. Penney  ATTORNEY Feb. 27, 1934.    E. BEHRINGER    1,949,265
FREEZING APPARATUS
Filed Dec. 31, 1930    2 Sheets-Sheet 2
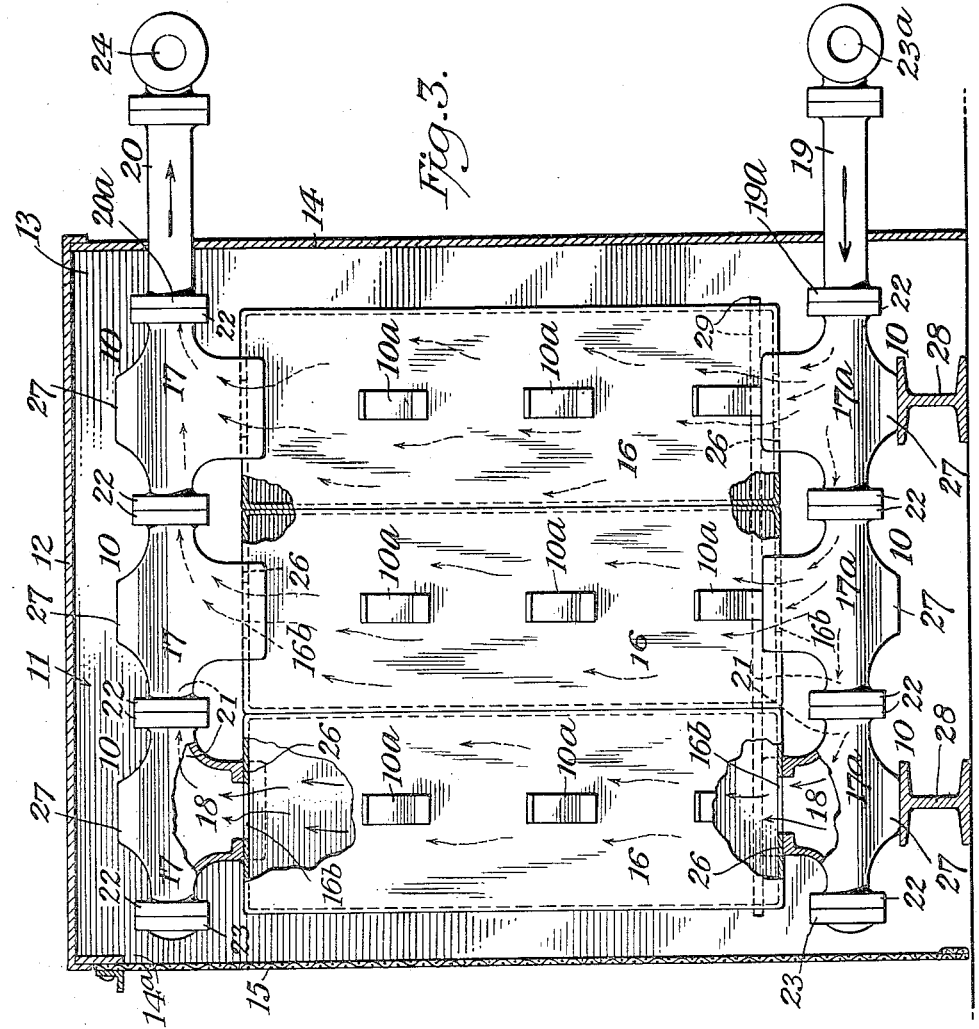
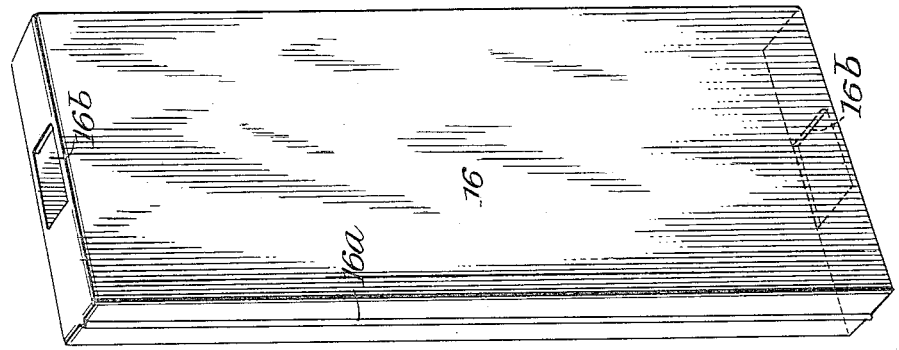
INVENTOR,
*Emil Behringer*
BY
*Harold D. Penney* ATTORNEY Patented Feb. 27, 1934

1,949,265

UNITED STATES PATENT OFFICE 1,949,265

FREEZING APPARATUS

Emil Behringer, New York, N. Y.

Application December 31, 1930
Serial No. 505,930

17 Claims. (Cl. 62—106)

My present invention relates to an improvement in freezing apparatus and has for its principal object an improvement in freezing or chilling cold cans, as a substitute for ice, in a quicker more economical manner than heretofore accomplished.

The main object is to rapidly chill and freeze closed, metallic fluid filled containers, and, to this end, this invention contemplates the provision of means whereby the greatest or maximum of surface contact between the cold can surfaces and the freezing means is accomplished so as to greatly facilitate the transfer of freezing temperatures from the freezing means to the means to be frozen.

This invention further contemplates the provision of a freezing apparatus so constructed as to afford a large area of chilling surface in a freezer so as to permit a large number of cold cans to be frozen at one time in a minimum of space and time.

Another advantage is to so construct the freezer units as to permit of easy assembly into a freezing device of any desired capacity, limited only by the capacity of the compressor apparatus to effectively care for such capacity.

Any of the well known absorption refrigerating systems may be used in the present apparatus, and in practice I prefer to use the well known ammonia system. As this system is well known, I have not included any showing of the same in this application, but have shown connections only, whereby my present invention may be connected thereto.

The foregoing disclosed and other advantages will be noted as the herein description proceeds and it will be obvious that modifications may be made in my device without departing from the spirit thereof nor the scope of the claims.

In the drawings,

Fig. 1 is a side elevation of my device with the casing in section;

Fig. 2 is a perspective view of a characteristic "cold can" showing its general features of construction;

Fig. 3 is a front view of Fig. 1 showing one of the freezers in section taken on line A—B Fig. 1, looking in the direction of the arrows, with the cold-cans omitted; and Fig. 4 is a perspective view of one of the freezer members, before the headers are welded thereto.

While many and variously contoured containers and contents may be frozen in the present apparatus, without change thereto, I have illustrated, in Fig. 2, a preferred form of cold can such as is used to refrigerate ice cream, meat and similar customarily chilled or frozen food products. These cans may be of any rectangular cross section and length. In the present instance, owing to the manner of use, the cold cans are triangular in cross sectional area, of suitable length, and are fluid tight; the can A, Fig. 2, having welded top and bottom caps B and E. These cans are virtually seamless, and the sealed or welded cover is provided with a handle D and a filler plug C.

In practice, the plug C is removed, and the can filled with any suitable freezable liquid, an air space being left therein for expansion, after which the plug is reinserted and tightly sealed to prevent leakage, after this the contents are frozen solid and reduced to any desired degree of cold temperatures. After freezing, the cold cans are distributed and located for refrigerant purposes as desired, and last a long time without leakage or mess, and after use, are returned for refreezing, and are replaced by freshly frozen cans. The foregoing forms no part of my present invention, but the improved freezing device, now to be described is the feature I desire to protect.

In the specification and claims throughout I have referred to the frozen members as "cold cans", and it will be understood that this term is used in a broader sense, so as to include ice cream packages and other packaged goods containing freezable products.

The freezing units 10 above referred to are similar one to the other throughout the apparatus, excepting those forming the ends thereof, and these end units differ only by reason of having end brackets 10a welded thereto for supporting additional cold cans to increase the capacity of the apparatus. By making the units similar in construction I may produce a freezing apparatus of required length, width or capacity by simply adding units as desired to correspond with the capacity of available compressor apparatus.

In carrying out my invention, I preferably provide a protecting enclosure or chamber 11, having tight top, side and back walls 12, 13 and 14 respectively, and an open front 14a, preferably closed by a heavy canvas, rubberized or other curtain 15, which serves to largely prevent the passage of air into said chamber when the freezing of the cold cans is proceeding or the escape of cold air from said chamber.

Each of the units going to make up the apparatus of the invention comprises parallel freezer panels or panel-flues 16 and top and bottom header castings 17 and 17a each having an arcuate conduit 18 connecting the ends of said panels or panel-flues 16, with horizontal ammonia supply and return pipe lines 19 and 20 respectively, said pipe lines being connected with the other castings 17 and 17a through flanges 19a and 20a and alined with side conduits 21 of said castings which are formed with opposite end flanges 22, to collectively form the header feed and return pipe lines of the apparatus. The dead end of each line may be closed by caps or plugs 23. The supply and return pipes 19 and 20 connected with my improved freezing apparatus are in turn connected with the main supply and return pipe lines 23a and 24 respectively, which are also made in sections to correspond with the freezer sections 10, and have end flanges 25, for connecting one section to another as shown, and other sections may be added for increased capacity if desired as above stated.

The freezer panel-flues each comprise a preferably flat rectangular hollow body of sheet metal connected along one side edge by a welded seam 16a, and its ends are provided with preferably rectangular openings 16b, which are so located to register with the outer ends of the arcuate conduits 18 in the header castings 17 and 17a, said castings being formed with longitudinal seats or grooves 26, corresponding in width to the ends of said freezer panel-flues, in which said flues are seated and securely sealed by welding against escape of ammonia fumes; this construction being best shown in Fig. 3, of the drawings, in which the direct upward path of the freezing element is indicated by arrows.

The header castings 17 and 17a are all formed with centrally projecting flat faced bosses or pads 27, and those pads on the lower castings, in the present construction, may rest on beams 28 for supporting the apparatus from the floor, and from the foregoing, it will be obvious that the parts are so formed that interchangeability thereof throughout the structure, is possible, to enhance replacement of parts, and to adapt the parts for assembly in apparatus of varied capacities.

Arranged to rest on the upper flanged portions of the lower castings 17a, is a floor or platform 29, for supporting the cold cans to be frozen and as shown in Fig. 1 of the drawings, these cans may be of various sizes but preferably triangular in cross section and the freezer panel-flues 16, are disposed equi-distant apart, the cold-cans being nested into the freezing spaces between the said freezing panels, with preferably their wider sides resting against the freezer panel walls but with some sizes of cold cans, a lesser side may be placed against the panel walls to facilitate intimate nesting of the cold-cans as shown in Fig. 1, and other cans may be placed on the brackets 10a for freezing, thus the capacity of a freezer of ordinary size is greatly increased.

The freezing spaces F between the panel flues 16, are of a width and length to accommodate a number of standard cold-cans in closely nested stacked position, the cans of the same size being stacked in the same space, so that intimate contact of the can faces with the walls of the freezer panel-flues may be uniform in each stack to produce uniform freezing of each stack of cans in the various freezing spaces F.

By the present freezing method, the cold-cans are simply deposited on horizontally coiled ammonia pipes, and is a slow process as there is much lost radiation by reason of the spaces between the ammonia pipe coils.

What I claim is:

1. In an apparatus for freezing cold-cans, in combination with a housing having a curtain for closing its open front side, a series of interconnected freezer units, each comprising top and bottom tubular header members each formed with a forked tubular extension having end ports and end seat grooves; panel-flues having end ports adapted to register with the ports of said header members, the ends of said panel-flues adapted to seat within said grooves and be welded therein, and means for directing a freezing agent through said flues and header members.

2. In a freezing apparatus, a plurality of vertically arranged panel-flues having end ports, said panel-flues being equally spaced from each other to form freezing spaces therebetween, cold-can supporting brackets secured to the outer faces of the panel-flues forming the ends of the apparatus; forked tubular header members; each fork thereof connected to the end of a panel flue and in communication with the interior of said flue through said ports, said header members being interconnected to direct a freezing liquid through the ports at the bottoms of said panel flues, upwardly and through the ports in the tops of said flues and outwardly through the header members at the top of the appartus, for freezing cold cans stacked in said freezing spaces.

3. In combination, an enclosure having a wide flat exterior face; means for introducing temperature changing medium into said enclosure; a non-upright can of triangular cross section having wide thin flat sides; and means engaging one side of the can for holding another of the sides by wedging action in firm wide heat-exchanging contact with said face.

4. In combination, an enclosure having refrigerant therein and having a long wide exterior face; a can including a side of limited area and having a long wide thin side shaped to conform and contact substantially throughout with said face; and means engaging the first mentioned side and holding said thin side in firm heat-exchanging contact with said face.

5. In combination, an enclosure having refrigerant therein having a long wide exterior face; a can of downwardly pointed wedge-shaped cross-section having a long wide thin flat side; and means engaging one side of the can for holding another side in firm heat-exchanging contact with said face.

6. In combination, an enclosure having refrigerant therein having a wide flat exterior face; a can of wedge shaped cross section having a long wide thin flat side to contact substantially throughout with said face; outwardly and upwardly inclined brackets on said face for holding said cans with their flat sides against said face; said brackets forming means for holding said flat sides in firm wide heat exchanging contact with said faces.

7. In combination, a plurality of spaced enclosures for temperature changing medium and having opposed wide flat faces forming a storage space therebetween; and cans having wide flat sides substantially filling and removably disposed in said space with some of said flat sides pressed respectively flat against said faces and said sides.

8. In combination, a plurality of spaced enclosures for temperature changing medium and having wide flat faces free of projections, forming a storage space therebetween; and cans having wide flat sides removably disposed one above the other, and substantially filling, said space with some of said flat sides pressed respectively flat against said faces and other of said sides.

9. In combination, a plurality of spaced enclosures for temperature changing medium and having wide flat faces, for forming a storage space therebetween; and cans of wedge shaped cross-section having wide flat sides removably disposed in said space with some of said flat sides wedged respectively flat against said faces and other of said sides.

10. In combination, a plurality of spaced enclosures for temperature changing medium and having opposed parallel upright wide flat faces forming a storage space therebetween; and nonupright elongated cans of triangular cross section having wide flat sides removably disposed in said space with some of said flat sides wedged respectively flat against said faces and other of said sides.

11. In combination, a plurality of upright enclosures having thin side walls having wide flat exterior faces spaced and parallel to such faces of the adjacent enclosures thereby forming storage spaces therebetween; means for introducing temperature changing medium into said enclosures; and a plurality of elongated cans of cross-section, having wide thin flat sides, removably horizontally disposed one above the other in said space with some of said flat sides respectively flat against said exterior faces and the flat sides of adjacent cans, the cans interacting to press each other against said faces.

12. In combination, a plurality of upright enclosures having thin side walls having wide flat exterior faces spaced from, and parallel to, said faces of the adjacent enclosures thereby forming storage spaces therebetween having parallel side faces; means for introducing temperature changing medium into said enclosures; supporting means at the lower part of said space perpendicular to said faces; and a plurality of elongated cans of right triangular cross-section having wide thin flat sides free of projections; said cans being removably disposed one above the other in said space with some of said flat sides respectively flat against said supporting means, said exterior faces and the flat sides of adjacent cans, the cans interacting to wedge sides thereof flat against said faces and other of said sides; said cans forming means for holding said flat sides in firm wide heat-exchanging contact with said faces.

13. A refrigerating device comprising in combination opposed hollow headers, having spaced ends and flat hollow panels disposed between the ends of said headers and communicating interiorly with the latter to provide a refrigerating compartment therebetween, said hollows being adapted to accommodate a refrigerating agent.

14. A refrigerating device for a container, comprising in combination opposed hollow headers, flat hollow panels disposed between said headers and communicating interiorly with the latter to provide a refrigerating compartment therebetween, and means for supporting a container in the compartment, said means including at least one of said headers and a platform carried thereby.

15. A refrigerating device for containers having flat surfaces, said device including in combination opposed hollow headers, hollow panels disposed between said headers and communicating interiorly with the latter to provide a refrigerating compartment therebetween, said hollows being adapted to contain a refrigerating agent, flat surfaces on said panels for engaging part of said first surfaces in temperature exchanging relation, and a flat plate carried by at least one of said headers for engaging one of said first surfaces in supporting relation in the compartment.

16. A refrigerating device for containers, comprising in combination a housing, top and bottom hollow headers disposed within said housing and spaced from its walls, flat hollow panels disposed between said headers and communicating interiorly with the latter to provide a refrigerating compartment therebetween, and means including said bottom headers for supporting containers in the compartment, said bottom headers having bosses integral therewith and disposed therebelow.

17. A refrigerating device for containers having flat surfaces, said device comprising in combination a housing having a front door, top and bottom headers disposed within said housing, hollow panels disposed between said headers and communicating interiorly with the latter to accommodate movement of a refrigerating fluid therethrough, said panels providing refrigerating spaces therebetween for receiving the containers in stacked horizontally movable condition, the ends of said containers being adjacent said door, flat surfaces on said panels for engaging part of said first surfaces in temperature exchanging relation, and supports including said bottom headers for the containers.

EMIL BEHRINGER.